United States Patent
Sella et al.

(10) Patent No.: US 11,113,403 B2
(45) Date of Patent: Sep. 7, 2021

(54) SPLIT CHAIN OF TRUST FOR SECURE DEVICE BOOT

(71) Applicant: Cisco Technology, Inc., San Jose, CA (US)

(72) Inventors: Yaron Sella, Beit Nekofa (IL); Kevin Holcomb, Apex, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 192 days.

(21) Appl. No.: 16/379,532

(22) Filed: Apr. 9, 2019

(65) Prior Publication Data

US 2020/0327232 A1 Oct. 15, 2020

(51) Int. Cl.
| | |
|---|---|
| *G06F 17/00* | (2019.01) |
| *G06F 21/57* | (2013.01) |
| *H04L 9/06* | (2006.01) |
| *G06K 9/62* | (2006.01) |
| *H04L 29/06* | (2006.01) |

(52) U.S. Cl.
CPC .......... *G06F 21/575* (2013.01); *G06F 21/572* (2013.01); *G06K 9/6215* (2013.01); *H04L 9/0643* (2013.01)

(58) Field of Classification Search
CPC ... G06F 21/575; G06F 21/572; H04L 9/0643; H04L 9/3236; G06K 9/6215
See application file for complete search history.

(56) References Cited

U.S. PATENT DOCUMENTS

| | | | |
|---|---|---|---|
| 2003/0028800 A1* | 2/2003 | Dayan | G06F 11/1433 726/34 |
| 2011/0010543 A1* | 1/2011 | Schmidt | H04L 63/123 713/168 |
| 2014/0089615 A1* | 3/2014 | Watanabe | G06F 9/4406 711/162 |
| 2014/0256419 A1* | 9/2014 | Laputz | G06F 21/575 463/29 |
| 2015/0052616 A1* | 2/2015 | Hutchison | G06F 21/57 726/27 |
| 2017/0099604 A1* | 4/2017 | Raleigh | H04L 41/046 |
| 2017/0177870 A1* | 6/2017 | Hildebrand | G06F 21/81 |
| 2017/0364685 A1* | 12/2017 | Shah | G06F 21/53 |
| 2018/0121117 A1* | 5/2018 | Berger | G06F 12/14 |
| 2018/0253556 A1* | 9/2018 | Karaginides | G06F 21/44 |
| 2019/0042753 A1* | 2/2019 | Jreij | G06F 11/1417 |
| 2019/0114432 A1* | 4/2019 | Tang | G06F 21/575 |

* cited by examiner

*Primary Examiner* — Gary S Gracia
(74) *Attorney, Agent, or Firm* — Johnson, Marcou, Isaacs & Nix, LLC

(57) ABSTRACT

The secure chain of trust steps to boot-up a computing device are split between the shutdown procedure of the computing device and the boot-up procedure of the computing device to reduce the time required for the computing device to boot-up. The main image associated with a central processing unit of the computing device is validated during the shutdown procedure of the computing device such that the operating system for the central processing unit is available when the computing device receives an action to power on. The boot-up time for the computing device is reduced, which allows the computing device to boot-up within an established time frame.

20 Claims, 6 Drawing Sheets

SPLIT CHAIN OF TRUST FOR SECURE DEVICE BOOT

TECHNICAL FIELD

This disclosure relates to splitting the secure chain of trust between the boot-up procedure and the shutdown procedure of a computing device to reduce the time required to boot-up the computing device while maintaining a secure boot sequence.

BACKGROUND

In conventional technologies, a computing device executes a chain of trust security mechanism during a boot-up procedure. The chain of trust is implemented by a series of stages where each stage verifies the integrity of the next stage using a digital signature before transferring control to the next stage. In a conventional system, the verification process may exceed an upper limit on the computing device's boot-up time. Exceeding an upper limit on the boot-up time may impact a user's safety or be an inconvenience for the user.

DETAILED DESCRIPTION

Overview

Figure 1:
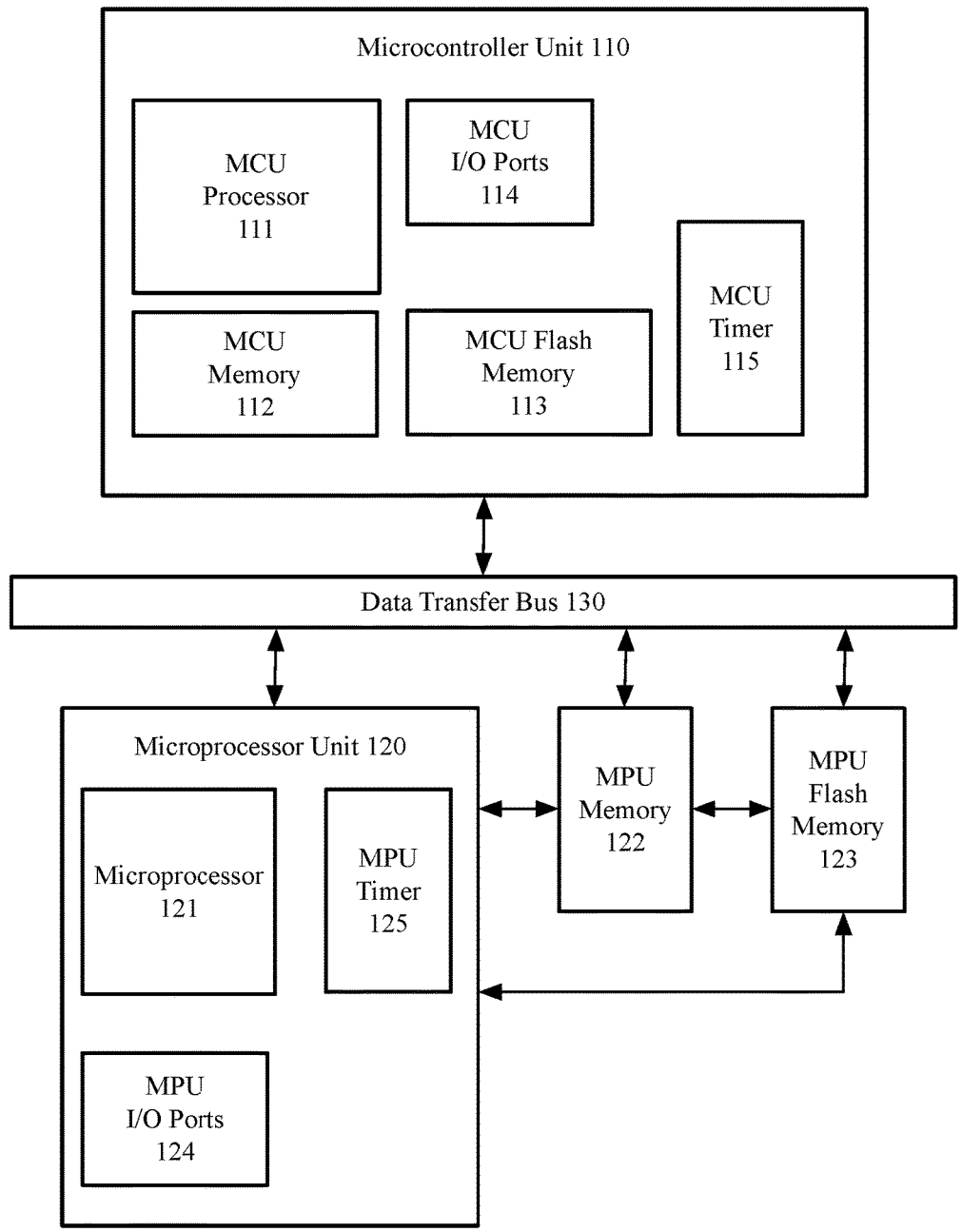
FIG. 1 is a diagram depicting an example computing device, in accordance with certain examples.

When a computing device is powered on, a startup or boot-up procedure is initiated. System operators may require a secure boot-up procedure. During the boot-up process, startup services can be loaded in secure stages until the operating system for the computing device is loaded. The secure stages may be referred to as a secure chain of trust. Depending upon the functional requirements of the computing device, there may be an upper limit on the time allowed for the computing device to boot-up.

The technology described herein provides techniques to divide or split the stages in the secure chain of trust between the shutdown process of the computing device and the boot-up process of the computing device, thereby reducing the time required to boot-up the computing device. In a typical application of a computing device, there is no upper limit on the time allowed for the computing device to complete the shutdown process.

The computing device is typically comprised of one or more central processing units ("CPU"). The computing device may be comprised of a microcontroller unit ("MCU") and a microprocessor unit ("MPU"). The MCU operates as the primary device in the control of the power on and shutdown aspects of the computing device. The MCU is typically an embedded system on a chip ("SoC") with integrated memory. The MCU has a relatively small amount of computing power and uses an efficient real-time operating system ("RTOS") or bare metal code execution. The MPU operates as a secondary device in the control of the power on and shutdown aspects of the computing device. The MPU typically has more computing power, utilizes external memory, and uses a rich operating system ("OS"). The MCU and the MPU each follow a secure chain of trust to boot-up when the computing device powers on. There are three primary steps that comprise the secure chain of trust. Each CPU accesses boot read only memory ("BootROM"), accesses a bootloader ("BL"), and validates a main image. The MCU completes the MCU secure chain of trust then allows the MPU to power on and complete the MPU secure chain of trust. The MCU main image is typically smaller and therefore validating the MCU main image does not pose significant time-constraints on the boot-up process. However, the MPU main image is typically larger and the MPU main image often cannot be validated as part of the boot-up procedure without exceeding the upper limit on the boot-up time.

When the computing device receives an action to shut down or power off, the MCU initiates a shutdown mode of the computing device. The MCU asserts an MPU power-on reset ("POR") which forces the MPU to reboot and stop at its bootloader to await further commands, such as to act as an intermediary or proxy to the MPU memory for the MCU. Alternatively, the MPU external memory may be on a data transfer bus which is directly accessible by the MCU. In this example, the MCU holds the MPU in a default, nonfunctional state. Asserting the MPU POR causes the MPU to tristate any output signals, thus isolating the MPU from control of any external memory. The MCU then accesses flash memory associated with the MPU. The MCU may access the MPU flash memory directly or via a proxy running in the MPU bootloader. The MPU main image is stored in the MPU flash memory. The MCU validates the MPU main image during the shutdown procedure so that the validation is complete prior to a subsequent boot-up of the computing device.

The MCU validates the MPU main image by verifying a digital signature on the MPU main image. The MCU validates the MPU main image through the use of a shutdown-verifier software application. The shutdown-verifier software application verifies the digital signature present on the MPU main image through the use of a public key to decrypt the digital signature. The decrypted hash of the digital signature is matched to a computed hash of the MPU main image. If the decrypted hash matches the computed hash, the MPU main image is determined to be valid. If the decrypted hash does not match the computed hash, the MPU main image is determined to be invalid. The shutdown-verifier software application may store the validation results in a secure area of the MPU flash memory or in the MCU flash memory. The MCU then enters a shutdown mode.

When the computing device receives a subsequent action to power on, the MPU main image has been validated as part of the shutdown process. The boot-up process of the computing device is initiated by the MCU. The MCU holds the MPU in POR to prevent the MPU from booting. The MCU follows the secure chain of trust for the MCU to boot and validates the MCU main image. If the MPU main image validation results are stored in the MPU flash memory, the MCU de-asserts the MPU POR to allow the MPU to begin booting. The MPU initiates the MPU secure chain of trust boot-up procedure using the MPU main image validated during the shutdown procedure. If the MPU main image was determined to be invalid, the MPU bootloader may attempt to locate a valid MPU main image and complete the secure boot-up procedure on that valid MPU main image. The MPU is not allowed to proceed to a MPU main image until the MPU main image has been validated.

If the MPU main image validation results are stored in the MCU flash memory, the MCU accesses the validation results for the MPU main image after the MCU validates the MCU main image. If the MPU main image was determined to be invalid, the MCU may de-assert the MPU POR and communicate boot-up procedures to the MPU. The MCU may instruct the MPU to locate a valid MPU main image to complete the secure boot-up procedure. If the MPU main image was determined to be valid, the MCU de-asserts the MPU POR to allow the MPU to begin booting. The MPU completes the MPU secure chain of trust boot-up procedure using the MPU main image validated previously during the shutdown procedure.

In conventional systems, each step of the secure chain of trust is implemented when a computing device receives an action to power on and/or boot-up. Validating the MPU main image during the boot-up procedure may cause the boot-up time for the computing device to exceed an upper limit due to the size of the MPU main image file. A user expects fast access to features associated with certain computing devices, for example automobiles, appliances, or video equipment. Splitting the secure chain of trust between the shutdown procedure and the boot-up procedure reduces the time for the computing device to boot-up, allowing the user faster access to those features associated with the computing device. As there is typically no upper limit on the time to shut down the computing device, increasing the time for the computing device to shut down does not affect the user or the operation of the computing device. For example, a user expects the systems in an automobile to be available when the automobile is powered on, however, the processing occurring after the automobile is turned off does not typically impede the user because the user has exited the vehicle.

These and other aspects, objects, features, and advantages of the examples will become apparent to those having ordinary skill in the art upon consideration of the following detailed description of illustrated examples.

Example System Architecture

Referring to the drawings, in which like numerals represent like (but not necessarily identical) elements throughout the figures, example embodiments are described in detail.

FIG. 1 is a diagram depicting an example computing device 100 illustratively comprising a microcontroller unit ("MCU") 110, a microprocessor unit ("MPU") 120, and a data transfer bus 130. The computing device 100 may be a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof.

The MCU 110 may be comprised of various internal components such as a MCU processor 111, a MCU memory 112, a MCU flash memory 113, one or more MCU input/output ("I/O") ports 114, and a MCU timer 115.

The MCU processor 111 may be configured to execute code or instructions to perform the operations and functionality described herein, manage request flow and address mappings, and to perform calculations and generate commands. The MCU processor 111 may be configured to monitor and control the operation of the components in the MCU 110.

The MCU memory 112 may include non-volatile memories such as read-only memory ("ROM"), programmable read-only memory ("PROM"), erasable programmable read-only memory ("EPROM"), flash memory, or any other device capable of storing program instructions or data with or without applied power. The MCU memory 112 may also include volatile memories such as random access memory ("RAM"), static random access memory ("SRAM"), dynamic random access memory ("DRAM"), and synchronous dynamic random access memory ("SDRAM"). Other types of RAM also may be used to implement the MCU memory 112. The MCU memory 112 may be implemented using a single memory module or multiple memory modules. While the MCU memory 112 is depicted as being part of the MCU 110, one skilled in the art will recognize that the MCU memory 112 may be separate from the MCU 110 without departing from the scope of the subject technology.

The MCU flash memory 113 may be an electronic non-volatile computer storage medium. The MCU flash memory 113 may include a non-volatile memory such as an electrically erasable read-only memory ("EEPROM"). The MCU flash memory 113 may be an embedded flash memory. The MCU flash memory 113 may store program or control code used by the MCU 110.

The MCU 110 may comprise one or more MCU I/O ports 114. The MCU I/O ports 114 may facilitate signal flow between the MCU 110 and external sensors and switches. The MCU I/O ports 114 may be configured with converters to enable the use of a variety of signal types. For example, an incoming analog signal may be converted into digital values or digital values may be converted into an output analog signal.

The MCU timer 115 may be a specialized type of clock to measure specific time intervals. The MCU timer 115 may count upwards for measuring elapsed time or may count down from a specified time interval. The MCU timer 115 may be a 16-bit timer or any other suitable timing device. The MCU timer 115 may be comprised of registers, for example a register for control and a register to hold a count number. The MCU 110 may use the MCU timer 115 to measure delay periods based on preset values. The MCU 110 may use the MCU timer 115 as an on-delay timer, an off-delay timer, or a retentive timer.

The MPU 120 may be comprised of various internal and/or external components such as a microprocessor 121, a MPU memory 122, a MPU flash memory 123, one or more MPU input/output ("I/O") ports 124, and a MPU timer 125.

The microprocessor 121 is a computer processor that functions off a single integrated circuit or multiple integrated circuits. The microprocessor 121 may be configured to execute code or instructions to perform the operations and functionality described herein, manage request flow and address mappings, and to perform calculations and generate commands. The microprocessor 121 may be configured to monitor and control the operation of the components in the MPU 120.

The MPU memory 122 may include non-volatile memories such as read-only memory ("ROM"), programmable read-only memory ("PROM"), erasable programmable read-only memory ("EPROM"), flash memory, or any other device capable of storing program instructions or data with or without applied power. The MPU memory 122 may also include volatile memories such as random access memory ("RAM"), static random access memory ("SRAM"), dynamic random access memory ("DRAM"), and synchronous dynamic random access memory ("SDRAM"). Other types of RAM also may be used to implement the MPU memory 122. The MPU memory 122 may be implemented using a single memory module or multiple memory modules. While the MPU memory 122 is depicted as being an external component of the MPU 120, one skilled in the art will recognize that the MPU memory 122 may be an internal component of the MPU 120 without departing from the scope of the subject technology.

The MPU flash memory 123 may be an electronic non-volatile computer storage medium. The MPU flash memory 123 may include a non-volatile memory such as an electrically erasable read-only memory ("EEPROM"). The MPU flash memory 123 may be an embedded flash memory. The MPU flash memory 123 may store program or control code used by the MPU 120.

The MPU 120 may comprise one or more MPU I/O ports 124. The MPU I/O ports 124 may facilitate signal flow between the MPU 120 and external sensors and switches. The MPU I/O ports 124 may be configured with converters to enable the use of a variety of signal types. For example, an incoming analog signal may be converted into digital values or digital values may be converted into an output analog signal.

The MPU timer 125 may be a specialized type of clock to measure specific time intervals. The MPU timer 125 may count upwards for measuring elapsed time or may count down from a specified time interval. The MPU timer 125 may be a 16-bit timer or any other suitable timing device. The MPU timer 125 may be comprised of registers, for example a register for control and a register to hold a count number. The MPU 120 may use the MPU timer 125 to measure delay periods based on preset values. The MPU 120 may use the MPU timer 125 as an on-delay timer, an off-delay timer, or a retentive timer.

The example computing device 100 may contain a data transfer bus 130. The data transfer bus may be a controller area network ("CAN"), a serial peripheral interface ("SPI") protocol, an inter-integrated circuit ("I²C") protocol, a manufacturing integration and intelligence application ("xMII"), a peripheral component interconnect express ("PCIe"), or any other suitable data transfer bus. The data transfer bus 130 may allow the MCU 110 access to the MPU flash memory 123 directly or via a proxy in the MPU bootloader. The MCU 110 may have read and write access to the MPU flash memory 123.

Example Processes

The example methods illustrated in FIGS. 2-5 are described hereinafter with respect to the components of the example computing device 100. The example methods of FIGS. 2-5 may also be performed with other systems and in other environments. The operations described with respect to any of the FIGS. 2-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
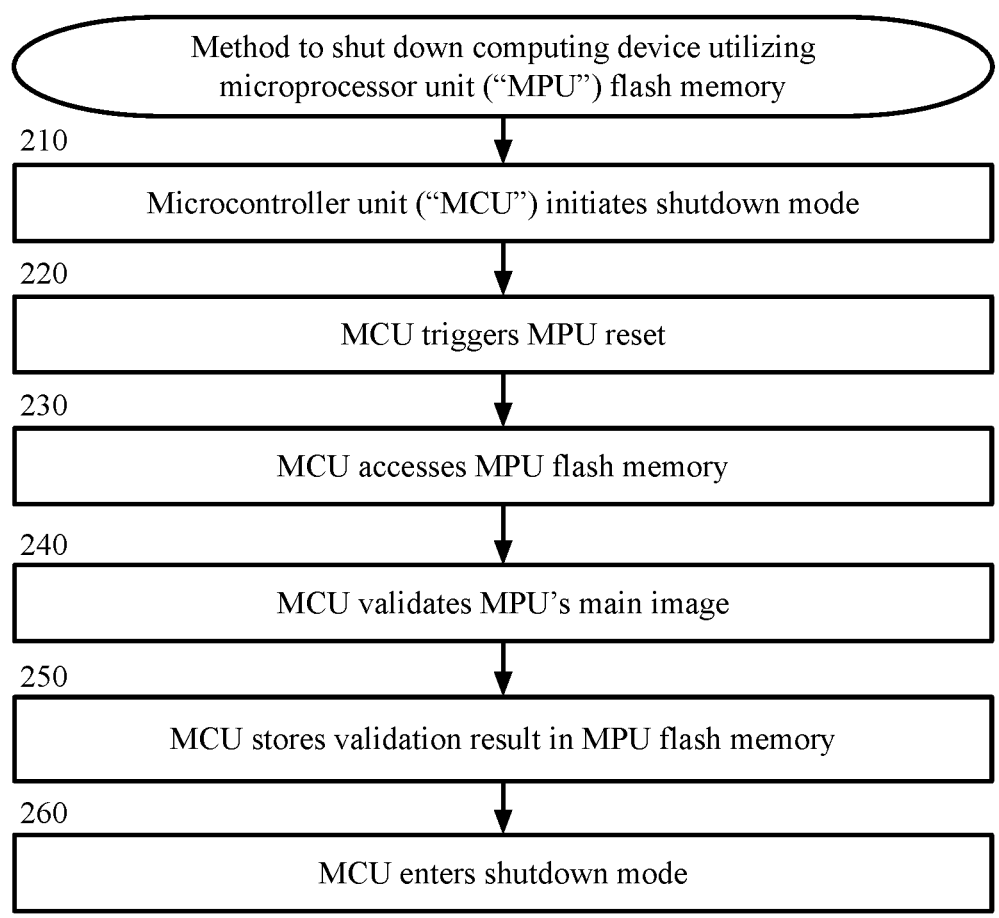
FIG. 2 is a block flow diagram depicting a method to shut down a computing device utilizing microprocessor unit ("MPU") flash memory, in accordance with certain examples.

FIG. 2 is a block flow diagram depicting a method 200 to shut down computing device 100 utilizing the microprocessor unit ("MPU") flash memory 123. In method 200, the MCU 110 operates as the primary device in the control of the power on and shutdown aspects of the computing device 100. The MPU 120 operates as a secondary device in the control of the power on and shutdown aspects of the computing device 100. The shutdown of computing device 100 may place the computing device 100 in a low-power (or "sleep") mode.

In block 210, the MCU 110 initiates the shutdown mode of computing device 100. The shutdown mode may be initiated by the MCU 110 based upon the receipt of an action to shut down computing device 100. A user may initiate the shutdown of computing device 100 by selecting a shutdown option on a user interface, by pressing a power button, by turning a key in a vehicle, or any other suitable action to initiate the shutdown. The shutdown mode may be initiated automatically after a predetermined period of inactivity. The shutdown mode may be initiated as a component of restarting or rebooting computing device 100.

The method 200 proceeds from block 210 to block 220 where the MCU 110 triggers the MPU 120 reset. Triggering the MPU 120 resets the MPU 120 and allows the MPU 120 to boot to the MPU 120 bootloader. The MPU 120 bootloader then awaits further instruction from the MCU 110. If the MPU 120 memory is directly connected to the data transfer bus 130, the MCU 110 may assert the MPU 120 power-on reset ("POR"). Asserting the MPU 120 POR places the MPU 120 in a nonfunctional state and isolates the MPU 120 from external interfaces.

The method 200 proceeds from block 220 to block 230 where the MCU 110 accesses the MPU flash memory 123. The MCU 110 may access the MPU flash memory 123 via the data transfer bus 130. The MCU 110 may send a request for data stored in the MPU flash memory 123 via the data transfer bus 130. The data may be transferred from the MPU flash memory 123 to the MCU 110 via the data transfer bus 130. The MCU 110 accesses the MPU flash memory 123 to receive the MPU 120 main image.

The method 200 proceeds from block 230 to block 240 where the MCU 110 validates the MPU 120 main image. The MCU 110 validates the MPU 120 main image during the shutdown procedure so that the MPU 120 can utilize the MPU 120 main image during a startup mode for the computing device 100 without further validation during the boot-up process. The MPU 120 main image is stored in the MPU flash memory 123. The main image may consist of a rich operating system ("OS").

The MCU 110 validates the MPU 120 main image by verifying a digital signature on the MPU 120 main image. The MCU 110 verifies the MPU 120 main image through the use of a shutdown-verifier software application. The shutdown-verifier software application code may be stored in the MCU flash memory 113. The shutdown-verifier software application may contain a digital signature algorithm to verify the digital signature on the MPU 120 main image. The shutdown-verifier software application computes a hash of the MPU 120 main image. Hashing converts data into a fixed-size (e.g., 32, 64) statistically-unique array of hexadecimal bytes. The shutdown-verifier software application then decrypts the MPU 120 main image digital signature using a public key. The public key for the MPU 120 main image may be stored in the MCU memory 112 or the MCU flash memory 113. The shutdown-verifier software application matches the computed hash of the MPU 120 main image with the decrypted hash of the MPU 120 main image digital signature. The shutdown-verifier software application verification process can have two results: the computed hash of the MPU 120 main image matches the decrypted hash of the MPU 120 main image digital signature and therefore the MPU 120 main image is valid, or the computed hash of the MPU 120 main image does not match the decrypted hash of the MPU 120 main image digital signature and therefore the MPU 120 main image is invalid.

The method 200 proceeds from block 240 to block 250 where the shutdown-verifier software application stores the validation results in the MPU flash memory 123. As a security feature, only software applications stored in the MCU flash memory 113 may write to the MPU flash memory 123. The validation results may be stored as a flag. A flag is a collection of bits used to indicate the validation results. The flag may be stored as true indicating that the MPU 120 main image is valid, or the flag may be stored as false indicating that the MPU 120 main image is invalid.

The method 200 proceeds from block 250 to block 260 where the MCU 110 enters a shutdown mode. The shutdown of MCU 110 may place the MCU 110 in a low-power (or "sleep") mode.

Figure 3:
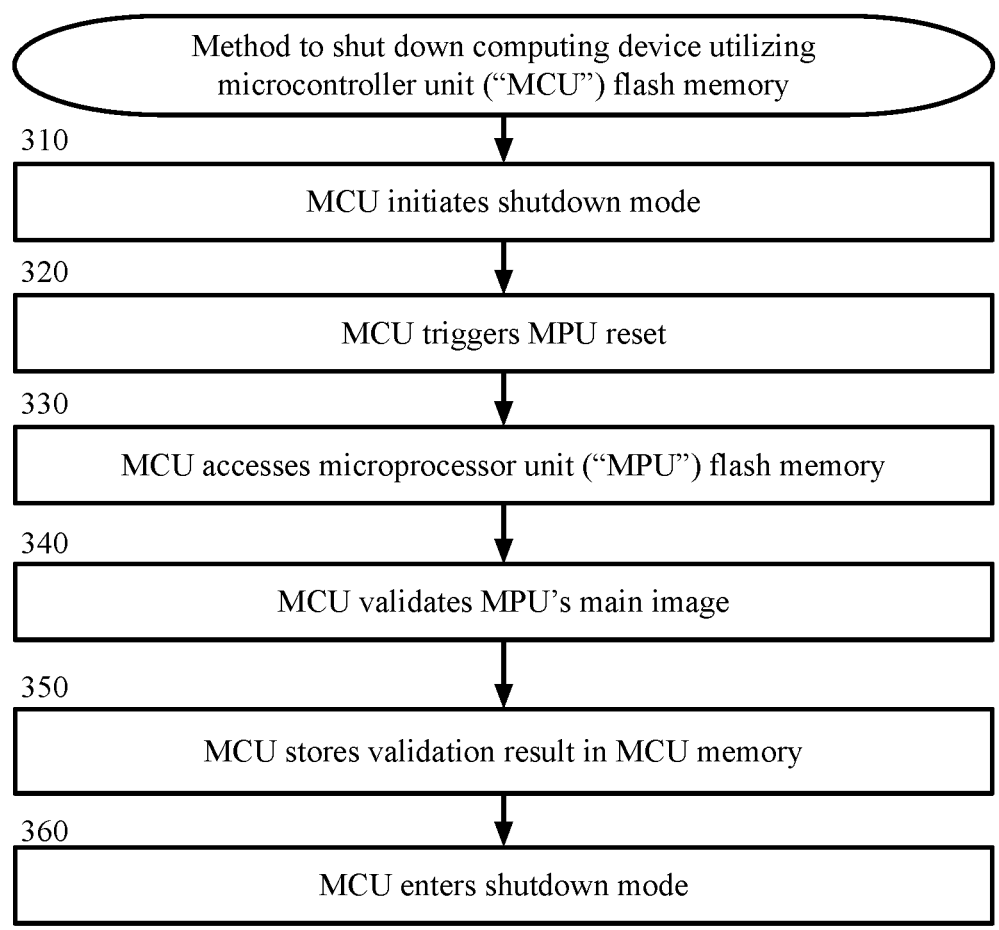
FIG. 3 is a block flow diagram depicting a method to shut down a computing device utilizing microcontroller unit ("MCU") flash memory, in accordance with certain examples.

FIG. 3 is a block flow diagram depicting a method 300 to shut down computing device 100 utilizing the microcontroller unit ("MCU") flash memory 113. In method 300, the MCU 110 operates as the primary device in the control of the power up and shut down aspects of computing device 100. The MPU 120 operates as a secondary device in the control of the power up and shut down aspects of computing device 100. The shutdown of computing device 100 may place the computing device 100 in a low-power (or "sleep") mode. In block 310, the MCU 110 initiates the shutdown mode of computing device 100. The shutdown mode may be initiated by the MCU 110 based upon the receipt of an action to shut down computing device 100. A user may initiate the shutdown of computing device 100 by selecting a shutdown option on a user interface, by pressing a power button, by turning a key in a vehicle, or any other suitable action to initiate the shutdown. The shutdown mode may be initiated automatically after a predetermined period of inactivity. The shutdown mode may be initiated as a component of restarting or rebooting computing device 100.

The method 300 proceeds from block 310 to block 320 where the MCU 110 asserts the MPU 120 reset. Triggering the MPU 120 resets the MPU 120 and allows the MPU 120 to boot to the MPU 120 bootloader. The MPU 120 bootloader then awaits further instruction from the MCU 110. If the MPU 120 memory is directly connected to the data transfer bus 130, the MCU 110 may assert the MPU 120 power-on reset ("POR"). Asserting the MPU 120 POR places the MPU 120 in a nonfunctional state and isolates the MPU 120 from external interfaces.

The method 300 proceeds from block 320 to block 330 where the MCU 110 accesses the MPU flash memory 123. The MCU 110 may access the MPU flash memory 123 via the data transfer bus 130. The MCU 110 may send a request for data stored in the MPU flash memory 123 via the data transfer bus 130. The data may be transferred from the MPU flash memory 123 to the MCU 110 via the data transfer bus 130. The MCU 110 accesses the MPU flash memory 123 to receive the MPU 120 main image.

The method 300 proceeds from block 330 to block 340 where the MCU 110 validates the MPU 120 main image. The MCU 110 validates the MPU 120 main image during the shutdown procedure so that the MPU 120 can utilize the MPU 120 main image during a startup mode for the computing device 100 without further validation during the boot-up process. The MPU 120 main image is stored in the MPU flash memory 123. The main image may consist of a rich operating system ("OS").

The MCU 110 validates the MPU 120 main image by verifying a digital signature on the MPU 120 main image. The MCU 110 verifies the MPU 120 main image through the use of a shutdown-verifier software application. The shutdown-verifier software application code may be stored in the MCU flash memory 113. The shutdown-verifier software application may contain a digital signature algorithm to verify the digital signature on the MPU 120 main image. The shutdown-verifier software application computes a hash of the MPU 120 main image. Hashing converts data into a fixed-size (e.g., 32, 64) statistically-unique array of hexadecimal bytes. The shutdown-verifier software application then decrypts the MPU 120 main image digital signature using a public key. The public key for the MPU 120 main image may be stored in the MCU memory 112 or the MCU flash memory 113. The shutdown-verifier software application matches the computed hash of the MPU 120 main image with the decrypted hash of the MPU 120 main image digital signature. The shutdown-verifier software application verification process can have two results: the computed hash of the MPU 120 main image matches the decrypted hash of the MPU 120 main image digital signature and therefore the MPU 120 main image is valid, or the computed hash of the MPU 120 main image does not match the decrypted hash of the MPU 120 main image digital signature and therefore the MPU 120 main image is invalid.

The method 300 proceeds from block 340 to block 350 where the MCU 110 stores the shutdown-verifier software application validation results in the MCU flash memory 113. The validation results may be stored as a flag. A flag is a collection of bits used to indicate the validation results. The flag may be stored as true indicating that the MPU 120 main image is valid, or the flag may be stored as false indicating that the MPU 120 main image is invalid.

The method 300 proceeds from block 350 to block 360 where the MCU 110 enters a shutdown mode. The shutdown of MCU 110 may place the MCU 110 in a low-power (or "sleep") mode.

Figure 4:
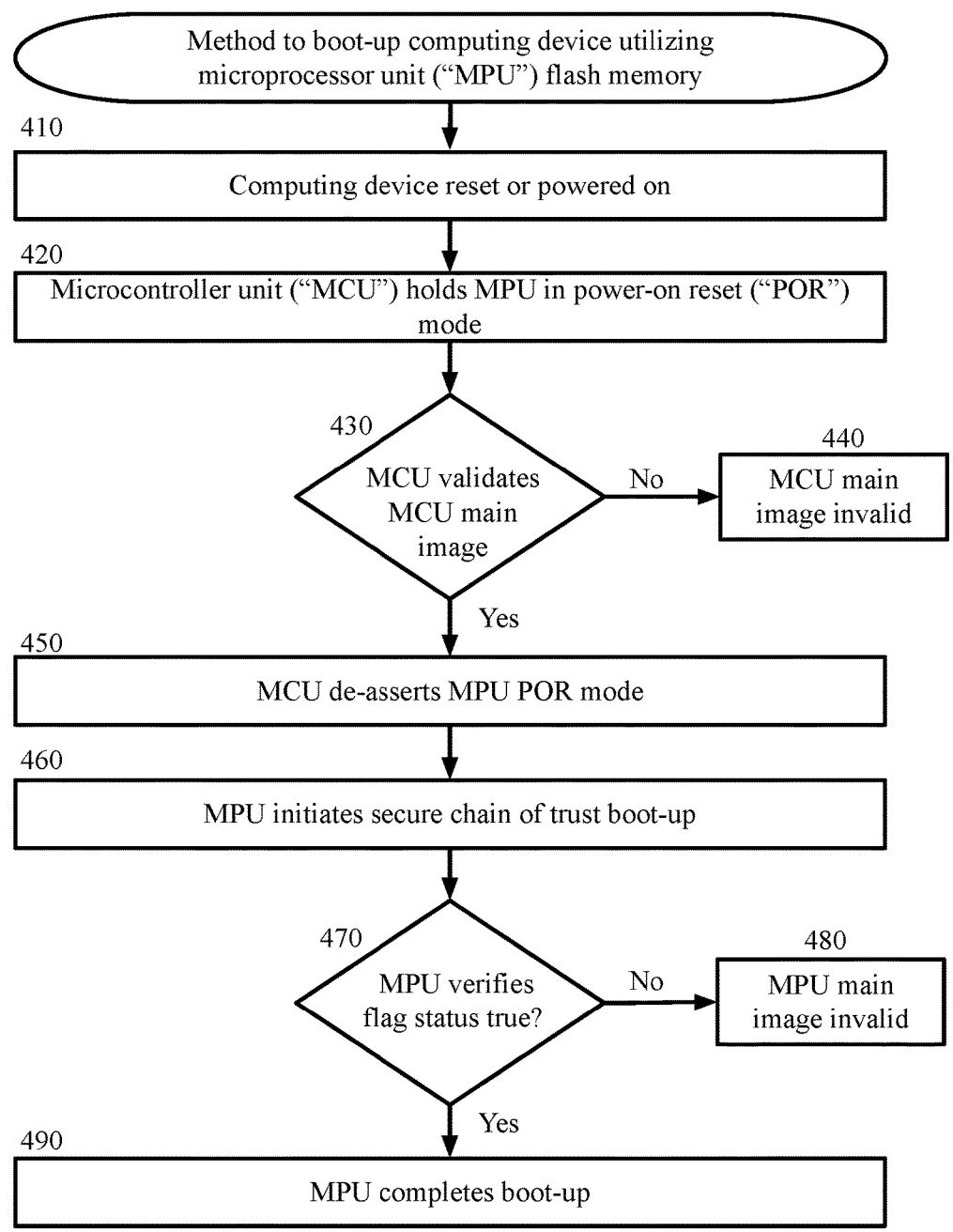
FIG. 4 is a block flow diagram depicting a method to boot-up a computing device utilizing MPU flash memory, in accordance with certain examples.

FIG. 4 is a block flow diagram depicting a method to boot-up computing device 100 utilizing microprocessor unit ("MPU") flash memory 123. In method 400, the MCU 110 operates as the primary device in the control of the power up and shut down aspects of computing device 100. The MPU 120 operates as a secondary device in the control of the power up and shut down aspects of computing device 100.

In block 410, computing device 100 is reset or powered on. Resetting computing device 100 or powering on computing device 100 initiates a boot-up process. Boot-up is the process of starting a computing device from a dead or offline state. Boot-up may be referred to as boot, booting, or start up. During the boot-up process, startup services are loaded in secure stages until the operating system for computing device 100 is loaded. The secure stages may be referred to as a secure chain of trust. In systems where the MCU 110 operates as the primary device in the control of the power up and shut down aspects of a computing device, the boot-up process may be initiated by the MCU 110. The boot-up process may be initiated by the MCU 110 based upon the receipt of an action to power on computing device 100. A network may send a command to power on computing device 100. A timer may be used to power on computing device 100. A user may initiate the power on of computing device 100 by pressing a power button, by pressing designated keys on a keyboard, by opening a screen on a laptop housing, or by turning a key in a vehicle. Any other suitable action may be used to initiate the power on of computing device 100.

The method 400 proceeds from block 410 to block 420 where the MCU 110 holds the MPU 120 in POR. The MCU 110 holds the MPU 120 in POR to prevent the MPU 120 from executing steps to begin booting. The POR prevents the MPU 120 from booting until the MCU 110 has executed the MCU 110 secure chain of trust to boot-up.

The method 400 proceeds from block 420 to block 430 where the MCU 110 validates the MCU 110 main image. The main image may consist of bare metal code or may be a real-time operating system ("RTOS"). The MCU 110 follows the secure chain of trust to boot-up and validate the MCU 110 main image. The MCU 110 accesses the MCU 110 boot read only memory ("BootROM"). The MCU 110 BootROM may be located within MCU memory 112 or any other suitable storage location. The MCU 110 BootROM is write protected. The MCU 110 BootROM contains the first code to be executed by the MCU 110 during the secure chain of trust boot-up process.

The BootROM allows the MCU 110 to access the MCU 110 bootloader ("BL"). The MCU 110 BL serves to load the main image for the MCU 110 and run the main image's startup procedure. The MCU 110 BL may be stored in the MCU flash memory 113. The MCU 110 main image may be stored in the MCU flash memory 113. The MCU 110 validates the MCU 110 main image by verifying a digital signature on the MCU 110 main image. The validation of the MCU 110 main image may be performed by a software application or any other suitable method to verify the MCU 110 main image. The software application code may be stored in the MCU flash memory 113. The software application may contain a digital signature algorithm to verify the digital signature on the MCU 110 main image. The software application computes a hash of the MCU 110 main image. Hashing converts data into a fixed-size (e.g., 32, 64) statistically-unique array of hexadecimal bytes. The software application then decrypts the MCU 110 main image digital signature using a public key. The public key for the MCU 110 main image may be stored in the MCU memory 112 or the MCU flash memory 113. The software application matches the computed hash of the MCU 110 main image with the decrypted hash of the MCU 110 main image digital signature. The software application verification process can have two results: the computed hash of the MCU 110 main image matches the decrypted hash of the MCU 110 main image digital signature and therefore the MCU 110 main image is valid or true, or the computed hash of the MCU 110 main image does not match the decrypted hash of the MCU 110 main image digital signature and therefore the MCU main image is invalid or false.

If the software application returns a false result for the MCU 110 main image validation, the method 400 proceeds from block 430 to block 440. At block 440, the MCU 110 main image is determined to be invalid. The MCU 110 may try to locate a valid MCU 110 main image and write the valid main image to the MCU flash memory 113. The MCU 110 may display an error message to a user or other suitable action to inform the user that the boot-up process was not securely completed. If the software application returns a true result for the MCU 110 main image validation at block 430, the MCU 110 BL begins execution of the MCU 110 main image. The MCU 110 completes the boot-up process and the method 400 proceeds from block 430 to block 450.

In block 450, the MCU 110 de-asserts the MPU 120 POR. The MCU 110 de-asserts the POR to allow the MPU 120 to begin booting. The POR may be de-asserted after a prescribed period of time. The MCU timer 115 may be configured to expire after a specified period of time. The specified period of time may be based on a measure of the elapsed time from the receipt of an action to reset or power on computing device 100 until the MCU 110 has completed the MCU 110 secure chain of trust. After the time period configured on the MCU timer 115 has expired, the MCU 110 may send a signal, for example to de-assert POR, to the MPU 120 to begin booting. The method 400 proceeds from block 450 to block 460.

In block 460, the MPU 120 initiates the MPU 120 secure chain of trust boot-up procedure. The MPU 120 follows the MPU 120 secure chain of trust to boot. The MPU 120 accesses the MPU 120 boot read only memory ("BootROM"). The MPU 120 BootROM may be located within a suitable read-only storage location. The MPU 120 BootROM contains the first code to be executed by the MPU 120 during the MPU secure chain of trust boot-up process. The BootROM allows the MPU 120 to access other memory. The BootROM allows the MPU 120 to access the MPU 120 bootloader ("BL"). The MPU 120 BL serves to load the main image for the MPU 120 and run the main image's startup procedure. The MPU 120 BL may be stored in the MPU flash memory 123.

The method 400 proceeds from block 460 to block 470 where the MPU 120 verifies the validation flag status previously set in block 250, which is described in greater detail with reference to FIG. 2. The validation flag status is stored in the MPU flash memory 123. If the status of the flag is false, the method 400 proceeds from block 470 to block 480. The MPU 120 main image is determined to be invalid. The MPU 120 may try to locate a valid MPU 120 main image and write the valid main image to the MPU flash memory 123. The MPU 120 is not allowed to proceed to a MPU 120 main image until the MPU 120 main image has been validated. The MPU 120 may perform any suitable action to continue the secure chain of trust to boot-up. If the MPU 120 is unable to securely boot-up, an error message may be displayed to a user.

If the status of the flag is true at block 470, the method 400 proceeds from block 470 to block 490. In block 490, the MPU 120 completes the boot-up process. The MPU 120 main image is validated and the MPU 120 BL accesses the MPU 120 main image which initiates the MPU 120 operating system.

Figure 5:
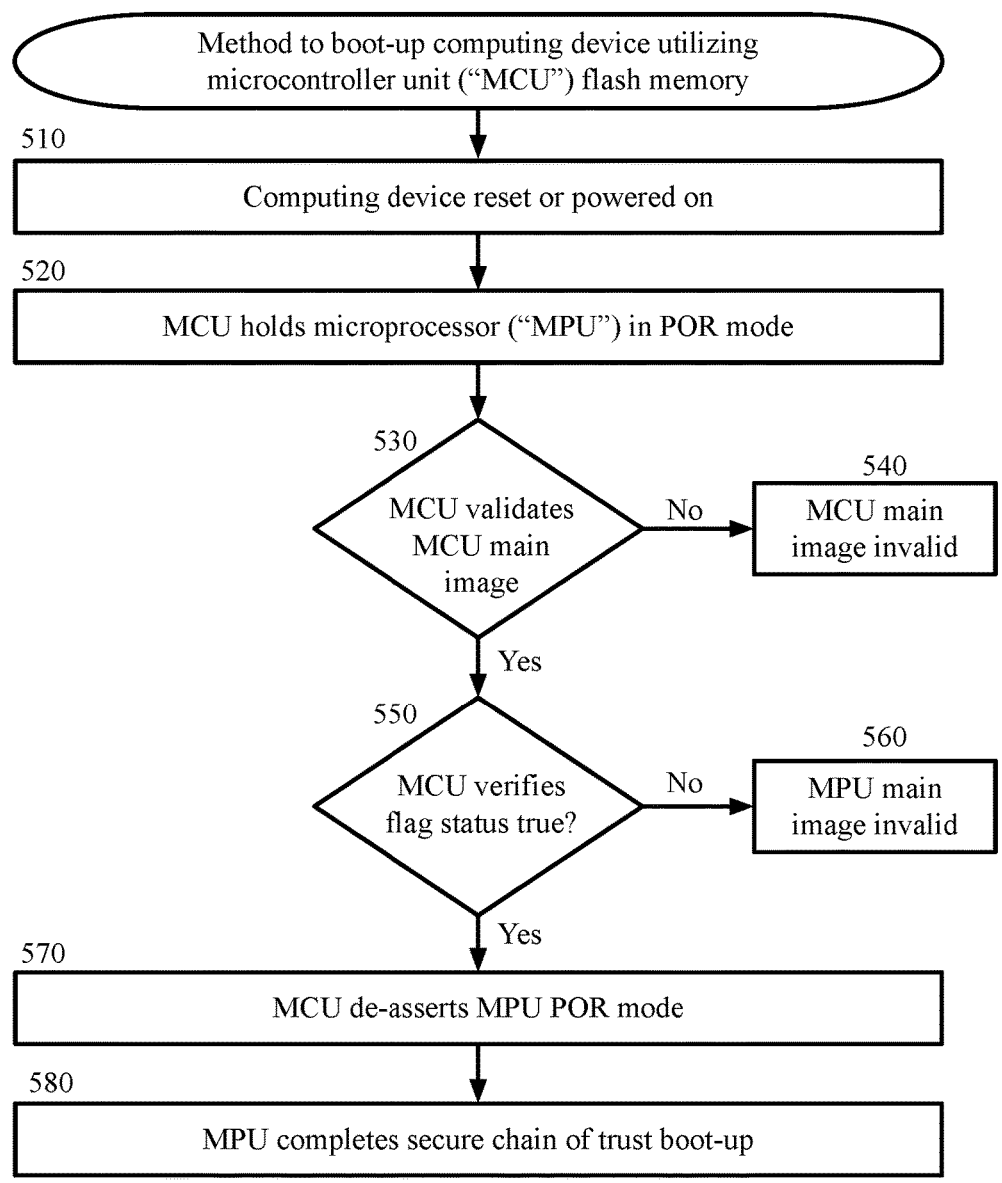
FIG. 5 is a block flow diagram depicting a method to boot-up a computing device utilizing MCU flash memory, in accordance with certain examples.

FIG. 5 is a block flow diagram depicting a method to boot-up computing device 100 utilizing microcontroller unit ("MCU") flash memory 113. In method 500, the MCU 110 operates as the primary device in the control of the power up and shut down aspects of computing device 100. The MPU 120 operates as a secondary device in the control of the power up and shut down aspects of computing device 100.

In block 510, computing device 100 is reset or powered on. Resetting computing device 100 or powering on computing device 100 initiates a boot-up process. Boot-up is the process of starting a computing device from a dead or offline state. Boot-up may be referred to as boot, booting, or start up. During the boot-up process, startup services are loaded in secure stages until the operating system for computing device 100 is loaded. The secure stages may be referred to as a secure chain of trust. In systems where the MCU 110 operates as the primary device in the control of the power up and shut down aspects of a computing device, the boot-up process may be initiated by the MCU 110. The boot-up process may be initiated by the MCU 110 based upon the receipt of an action to power on computing device 100. A network may send a command to power on computing device 100. A timer may be used to power on computing device 100. A user may initiate the power on of computing device 100 by pressing a power button, by pressing designated keys on a keyboard, by opening a screen on a laptop housing, or by turning a key in a vehicle. Any other suitable action may be used to initiate the power on of computing device 100.

The method 500 proceeds from block 510 to block 520 where the MCU 110 holds the MPU 120 in POR. The MCU 110 holds the MPU 120 in POR to prevent the MPU 120 from executing steps to begin booting. The POR prevents the MPU 120 from booting until the MCU 110 has executed the MCU 110 secure chain of trust to boot-up.

The method 500 proceeds from block 520 to block 530 where the MCU 110 validates the MCU 110 main image. The main image may consist of bare metal code or may be a real-time operating system ("RTOS"). The MCU 110 follows the secure chain of trust to boot-up and validate the MCU 110 main image. The MCU 110 accesses the MCU 110 boot read only memory ("BootROM"). The MCU 110 BootROM may be located within MCU memory 112 or any other suitable storage location. The MCU 110 BootROM is write protected. The MCU 110 BootROM contains the first code to be executed by the MCU 110 during the secure chain of trust boot-up process.

The BootROM allows the MCU 110 to access the MCU 110 bootloader ("BL"). The MCU 110 BL serves to load the main image for the MCU 110 and run the main image's startup procedure. The MCU 110 BL may be stored in the MCU flash memory 113. The MCU 110 main image may be stored in the MCU flash memory 113. The MCU 110 validates the MCU 110 main image by verifying a digital signature on the MCU 110 main image. The validation of the MCU 110 main image may be performed by a software application or any other suitable method to verify the MCU 110 main image. The software application code may be stored in the MCU flash memory 113. The software application may contain a digital signature algorithm to verify the digital signature on the MCU 110 main image. The software application computes a hash of the MCU 110 main image. Hashing converts data into a fixed-size (e.g., 32, 64) statistically-unique array of hexadecimal bytes. The software application then decrypts the MCU 110 main image digital signature using a public key. The public key for the MCU 110 main image may be stored in the MCU memory 112 or the MCU flash memory 113. The software application matches the computed hash of the MCU 110 main image with the decrypted hash of the MCU 110 main image digital signature. The software application verification process can have two results: the computed hash of the MCU 110 main image matches the decrypted hash of the MCU 110 main image digital signature and therefore the MCU 110 main image is valid or true, or the computed hash of the MCU 110 main image does not match the decrypted hash of the MCU 110 main image digital signature and therefore the MCU main image is invalid or false.

If the software application returns a false result for the MCU 110 main image validation, the method 500 proceeds from block 530 to block 540. At block 540, the MCU 110 main image is determined to be invalid. The MCU 110 may try to locate a valid MCU 110 main image and write the valid main image to the MCU flash memory 113. The MCU 110 may display an error message to a user or other suitable action to inform the user that the boot-up process was not securely completed. If the software application returns a true result for the MCU 110 main image validation at block 530, the MCU 110 completes the MCU boot-up process and the method 500 proceeds from block 530 to block 550.

In block 550, the MCU 120 verifies the validation flag status previously set in block 250, which is described in greater detail with reference to FIG. 2. The validation flag status indicates if the digital signature present on the MPU 120 main image was validated in block 240, which is described in greater detail with reference to FIG. 2. If the status of the validation flag is false, the method 500 proceeds from block 550 to block 560. The MPU 120 main image is determined to be invalid. The MCU 110 de-asserts the MPU 120 POR. The MCU 110 de-asserts the POR to allow the MPU 120 to begin booting. The MCU 110 establishes communications with MPU 120 to communicate boot-up procedures to the MPU 120. The communications may be established through an interface such as a serial peripheral interface ("SPI") or any other suitable interface. The MCU 110 may send commands to the MPU 120 to initiate boot-up but not continue to the MPU 120 main image. The MPU 120 may try to locate a valid MPU 120 main image and write the valid main image to the MPU flash memory 123. The MPU 120 is not allowed to proceed to a MPU 120 main image until the MPU 120 main image has been validated. The MPU 120 may perform any suitable action to continue the secure chain of trust to boot-up.

If the status of the validation flag is true at block 550, the method 500 proceeds from block 550 to block 570. In block 570, the MCU 110 de-asserts the MPU 120 POR. The MCU 110 de-asserts the POR to allow the MPU 120 to begin booting. The POR may be de-asserted after the MCU 110 has completed the MCU 110 secure chain of trust and verified the validation flag status in block 550. Any suitable action may be taken to allow the MPU 120 to begin booting.

The method 500 proceeds from block 570 to block 580. In block 580, the MPU 120 completes the MPU 120 secure chain of trust boot-up procedure. The MPU 120 accesses the MPU 120 boot read only memory ("BootROM"). The MPU 120 BootROM may be located within MPU memory 122 or any other suitable storage location. The MPU 120 BootROM is write protected. The MPU 120 BootROM contains the first code to be executed by the MPU 120 during the MPU 120 secure chain of trust boot-up process. The BootROM allows the MPU 120 to access other memory. The BootROM allows the MPU 120 to access the MPU 120 bootloader ("BL"). The MPU 120 BL may be stored in the MPU flash memory 123. The MPU 120 BL accesses the MPU 120 main image which initiates the MPU 120 operating system.

Other Examples

Figure 6:
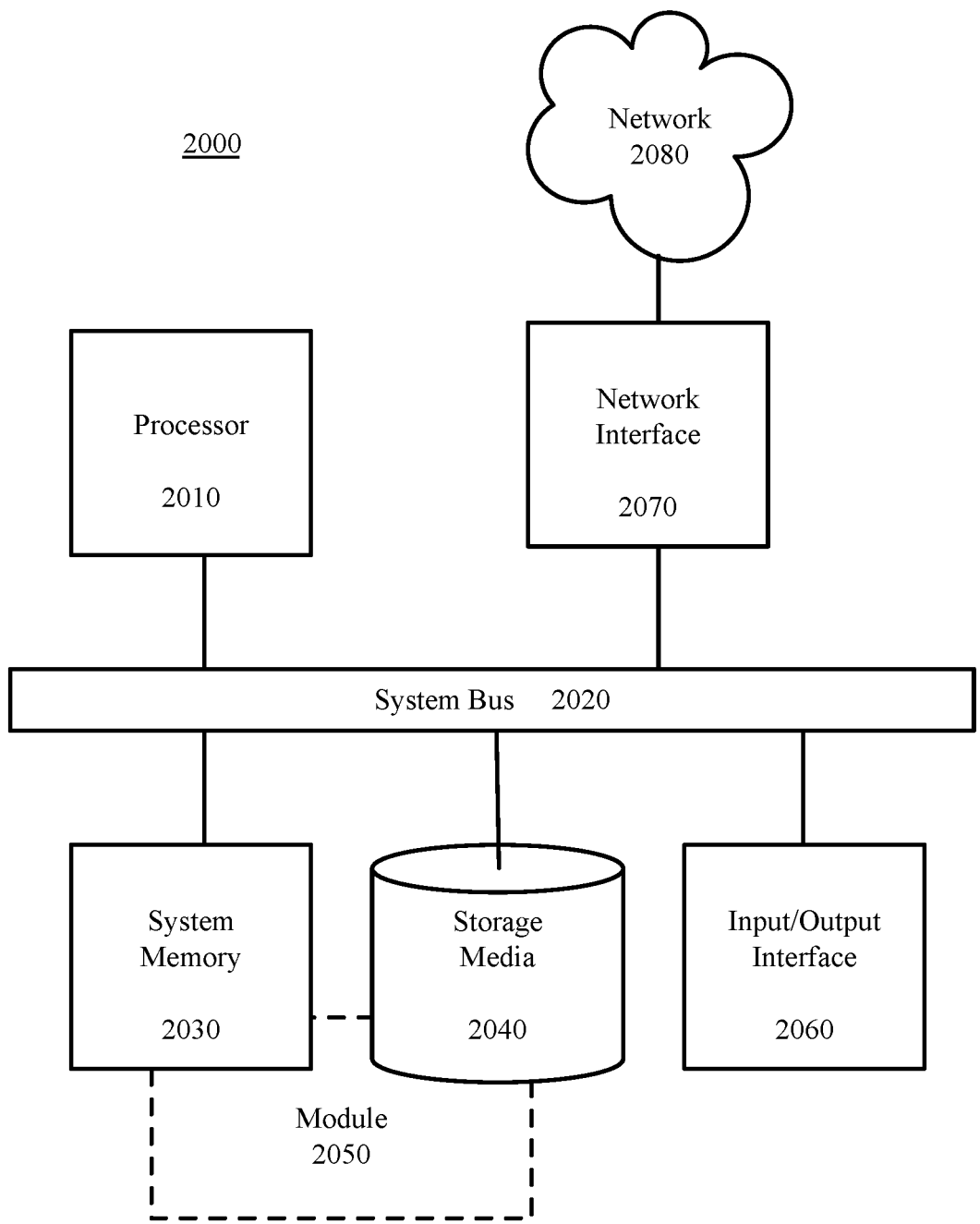
FIG. 6 is a block diagram depicting a computing machine and a module, in accordance with certain examples.

FIG. 6 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method, comprising:
    by a first processor of a computing device,
    obtaining a first input indicating a request to shut down the computing device;
    initiating a shutdown mode of the computing device, the shutdown mode comprising:
        asserting a power-on reset (POR) mode on a second processor to prevent the second processor from executing a boot-up procedure until the first processor has executed a secure chain of trust to boot-up,
        validating an image associated with the second processor of the computing device by verifying a signature of the image, wherein the second processor image is stored in a memory location associated with the second processor,
        storing results of the validation of the second processor image in a memory location associated with the first processor, and
        initiating a low power mode for the computing device;
    obtaining a second input indicating a request to power on the computing device;
    executing a boot-up procedure for the first processor;
    de-asserting the POR mode of the second processor, wherein de-asserting the POR mode of the second processor allows the second processor to execute the secure chain of trust to boot-up;
    providing instructions to the second processor to execute the boot-up procedure for the second processor, wherein the instructions comprise instructions to verify a status of the validated second processor image based on the stored validation results; and
    when the status indicates that the second processor image is valid, executing, by the second processor, the boot-up procedure, wherein executing the boot-up procedure comprises using the second processor image to initiate an operating system of the computing device.

2. The method of claim 1, wherein the second processor image is an operating system for the second processor.

3. The method of claim 1, wherein validating the second processor image comprises:
    obtaining the second processor image stored in the memory location associated with the second processor;
    converting the second processor image into a fixed-size byte array;
    obtaining a key associated with the second processor image, wherein the key is stored in a memory location associated with the first processor;
    obtaining a signature associated with the second processor image, wherein the signature is stored in the memory location associated with the second processor;

converting the signature associated with the second processor image into a fixed-size byte array using the key associated with the second processor image;
matching the byte array of the converted second processor image with the byte array of the converted signature; and
storing the validation results as true based on a determination that the byte array of the converted second processor image matches the byte array of the converted signature.

4. The method of claim 1, wherein executing the boot-up procedure for the first processor comprises:
validating a first processor image associated with the first processor, wherein the first processor image is an operating system for the first processor; and
utilizing the validated first processor image to boot-up the first processor.

5. The method of claim 4, wherein validating the first processor image comprises:
converting the first processor image into a fixed-size byte array;
obtaining a key associated with the first processor image, wherein the key is stored in a memory location associated with the first processor;
obtaining a signature associated with the first processor image, wherein the signature is stored in the memory location associated with the first processor;
converting the signature associated with the first processor image into a fixed-size byte array using the key associated with the first processor image;
matching the byte array of the converted first processor image with the byte array of the converted signature; and
based on a determination that the byte array of the converted first processor image matches the byte array of the converted signature, determining that the first processor image is valid.

6. The method of claim 1, wherein verifying the status of the stored second processor image comprises determining, by the second processor of the computing device, that the stored validation results are true.

7. The method of claim 1, wherein the shutdown mode is a low power mode.

8. A computer program product, comprising:
a non-transitory computer-readable medium having computer-executable program instructions embodied thereon to:
obtain an input indicating a request to shut down a computing device;
initiate a shutdown mode of the computing device, the shutdown mode comprising computer-executable program instructions to:
assert a power-on reset (POR) mode on a second processor to prevent the second processor from executing a boot-up procedure until the first processor has executed a secure chain of trust to boot-up,
validate an image associated with the second processor of the computing device by verifying a signature of the image, wherein the second processor image is stored in a memory location associated with the second processor,
store results of the validation of the second processor image in a memory location associated with the first processor, and
initiate a low power mode for the computing device;
obtain a second input indicating a request to power on the computing device;
execute a boot-up procedure for the first processor;
de-assert the POR mode of the second processor, wherein de-asserting the POR mode of the second processor allows the second processor to execute the secure chain of trust to boot-up;
provide instructions to the second processor execute the boot-up procedure for the second processor, wherein the instructions comprise instructions to verify a status of the validated second processor image based on the stored validation results; and
when the status indicates that the second processor image is valid, execute, by the second processor, the boot-up procedure, wherein executing the boot-up procedure comprises using the second processor image to initiate an operating system of the computing device.

9. The computer program product of claim 8, wherein the second processor image is an operating system for the second processor.

10. The computer program product of claim 8, wherein validating the second processor image comprises computer-executable program instructions to:
obtain the second processor image stored in the memory location associated with the second processor;
convert the second processor image into a fixed-size byte array;
obtain a key associated with the second processor image, wherein the key is stored in a memory location associated with the first processor;
obtain a signature associated with the second processor image, wherein the signature is stored in the memory location associated with the second processor;
convert, using the key associated with the second processor image, the signature associated with the second processor image into a fixed-size byte array;
match the byte array of the converted second processor image with the byte array of the converted signature; and
store the validation results as true based on a determination that the byte array of the converted second processor image matches the byte array of the converted signature.

11. The computer program product of claim 8, wherein executing the boot-up procedure for the first processor comprises computer-executable program instructions to:
validate a first processor image associated with the first processor, wherein the first processor image is an operating system for the first processor; and
utilize the validated first processor image to boot-up the first processor.

12. The computer program product of claim 11, wherein validating the first processor image comprises computer-executable program instructions to:
convert the first processor image into a fixed-size byte array;
obtain a key associated with the first processor image, wherein the key is stored in a memory location associated with the first processor;
obtain a signature associated with the first processor image, wherein the signature is stored in the memory location associated with the first processor;
convert the signature associated with the first processor image into a fixed-size byte array using the key associated with the first processor image;
match the byte array of the converted first processor image with the byte array of the converted signature; and based on a determination that the byte array of the converted first processor image matches the byte array of the converted signature, determine that the first processor image is valid.

13. The computer program product of claim 8, wherein verifying the status of the stored second processor image comprises computer-executable program instructions to determine, by the second processor, the stored validation results as true.

14. The computer program product of claim 8, wherein the shutdown mode is a low power mode.

15. A system, comprising:
a storage device;
a first processor communicatively coupled to the storage device; and a second processor communicatively coupled to the storage device, wherein the first processor executes application code instructions that are stored in the storage device to cause the system to:
obtain an input indicating a request to shut down a computing device;
initiate a shutdown mode of the computing device, the shutdown mode comprising application code instructions to:
assert a power-on reset (POR) mode on the second processor to prevent the second processor from executing a boot-up procedure until the first processor has executed a secure chain of trust to boot-up,
validate an image associated with the second processor of the computing device by verifying a signature of the image, wherein the second processor image is stored in a memory location associated with the second processor,
store results of the validation of the second processor image in a memory location associated with the first processor, and
initiate a low power mode for the computing device;
obtain a second input indicating a request to power on the computing device;
execute a boot-up procedure for the first processor;
de-assert the POR mode of the second processor, wherein de-asserting the POR mode of the second processor allows the second processor to execute the secure chain of trust to boot-up; and
provide instructions to the second processor of the computing device to execute the boot-up procedure for the second processor, wherein the instructions comprise instructions to verify a status of the validated second processor image based on the stored validation results; and wherein the second processor executes application code instructions that are stored in the storage device to cause the system to:
execute the boot-up procedure when the status indicates that the second processor image is valid, wherein executing the boot-up procedure comprises using the second processor image to initiate an operating system of the computing device.

16. The system of claim 15, wherein the second processor image is an operating system for the second processor.

17. The system of claim 15, wherein validating the second processor image comprises application code instructions to:
obtain the second processor image stored in the memory location associated with the second processor;
convert the second processor image into a fixed-size byte array;
obtain a key associated with the second processor image, wherein the key is stored in a memory location associated with the first processor;
obtain a signature associated with the second processor image, wherein the signature is stored in the memory location associated with the second processor;
convert, using the key associated with the second processor image, the signature associated with the second processor image into a fixed-size byte array;
match the byte array of the converted second processor image with the byte array of the converted signature; and
store the validation results as true based on a determination that the byte array of the converted second processor image matches the byte array of the converted signature.

18. The system of claim 15, wherein executing the boot-up procedure for the first processor comprises application code instructions to:
validate a first processor image associated with the first processor, wherein the first processor image is an operating system for the first processor; and
utilize the validated first processor image to boot-up the first processor.

19. The system of claim 15, wherein verifying the status of the stored second processor image comprises application code instructions to determine that the stored validation results are true.

20. The system of claim 15, wherein the shutdown mode is a low power mode.

* * * * *